(12) United States Patent  (10) Patent No.: US 7,701,683 B2
Morris et al.  (45) Date of Patent: *Apr. 20, 2010

(54) APPARATUS, SYSTEM, AND METHOD FOR SHARING OUTPUT CONTACTS ACROSS MULTIPLE RELAYS

(75) Inventors: Robert E. Morris, Viola, ID (US); Mark W. Feltis, Pullman, WA (US); Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 680 days.

This patent is subject to a terminal disclaimer.

(21) Appl. No.: 11/540,253

(22) Filed: Sep. 29, 2006

(65) Prior Publication Data

US 2007/0025036 A1 Feb. 1, 2007

Related U.S. Application Data

(63) Continuation-in-part of application No. 11/211,816, filed on Aug. 25, 2005, now Pat. No. 7,463,467, which is a continuation-in-part of application No. 09/900,098, filed on Jul. 6, 2001, now Pat. No. 6,947,269.

(51) Int. Cl.
  *H02H 7/00* (2006.01)
(52) U.S. Cl. ....................................... 361/64
(58) Field of Classification Search ............... 361/64
  See application file for complete search history.

(56) References Cited

U.S. PATENT DOCUMENTS

| | | | |
|---|---|---|---|
| 3,702,379 A | 11/1972 | Peterson et al. | |
| 4,015,206 A | 3/1977 | Huntley | |
| 4,020,396 A | 4/1977 | Gamble | |
| 4,148,087 A | 4/1979 | Phadke | |
| 4,276,605 A | 6/1981 | Okamoto et al. | |
| 4,420,805 A | 12/1983 | Yamaura et al. | |
| 4,502,086 A | 2/1985 | Ebisaka | |
| 4,528,611 A | 7/1985 | Udren | |
| 4,551,718 A | 11/1985 | Cookson | |
| 4,561,120 A | 12/1985 | Andow et al. | |

(Continued)

FOREIGN PATENT DOCUMENTS

EP  0231 528 B1  3/1994

(Continued)

OTHER PUBLICATIONS

Translation of Siemen letter dated Jun. 14, 2004 to EPO Munich in opposition to EP 0810714.

(Continued)

*Primary Examiner*—Stephen W Jackson
(74) *Attorney, Agent, or Firm*—Eugene M. Cummings, P.C.

(57) ABSTRACT

A power system device-to-device direct communication system comprises a first intelligent electronic device with a processor and a transmit module. Software within the processor maintains a list of "virtual outputs," which correspond to a number of data channels maintained within the transmit module. The second intelligent electronic device receives the data channels from the first intelligent electronic device and extracts the virtual output bits. The second intelligent electronic device then adjusts a group of its own output contacts in accordance with the received virtual output bits.

12 Claims, 6 Drawing Sheets

U.S. PATENT DOCUMENTS

| | | | |
|---|---|---|---|
| 4,620,257 | A | 10/1986 | Sano |
| 4,672,501 | A | 6/1987 | Bilac et al. |
| 4,731,689 | A | 3/1988 | Nimmersjo et al. |
| 4,821,137 | A | 4/1989 | Wilkinson |
| 4,871,971 | A | 10/1989 | Jeerings et al. |
| 4,896,241 | A | 1/1990 | Li et al. |
| 4,899,383 | A | 2/1990 | Einolf |
| 4,935,837 | A | 6/1990 | Sun |
| 4,972,290 | A | 11/1990 | Sun |
| 5,069,521 | A | 12/1991 | Hardwick |
| 5,095,399 | A | 3/1992 | Terada et al. |
| 5,185,736 | A | 2/1993 | Tyrrell et al. |
| 5,218,465 | A | 6/1993 | Lebby |
| 5,235,599 | A | 8/1993 | Nishimura |
| 5,267,231 | A | 11/1993 | Dzieduszko |
| 5,283,781 | A | 2/1994 | Buda |
| 5,293,295 | A | 3/1994 | Nishitani |
| 5,311,508 | A | 5/1994 | Buda |
| 5,317,472 | A | 5/1994 | Schweitzer, III |
| 5,341,268 | A | 8/1994 | Ishiguro et al. |
| 5,367,426 | A | 11/1994 | Schweitzer, III |
| 5,371,736 | A | 12/1994 | Evan |
| 5,428,553 | A | 6/1995 | Chiba |
| 5,461,607 | A | 10/1995 | Miyagi |
| 5,473,608 | A | 12/1995 | Gagne et al. |
| 5,481,532 | A | 1/1996 | Hassan |
| 5,576,625 | A | 11/1996 | Sukegawa |
| 5,793,750 | A | 8/1998 | Schweitzer, III et al. |
| 5,838,525 | A | 11/1998 | Ward |
| 5,889,474 | A | 3/1999 | Ladue |
| 5,940,260 | A | 8/1999 | Gelbien |
| 5,982,595 | A | 11/1999 | Pozzuoli |
| 6,005,759 | A | 12/1999 | Hart |
| 6,160,806 | A | 12/2000 | Cantwell |
| 6,469,629 | B1 | 10/2002 | Campbell |
| 7,027,896 | B2 | 4/2006 | Thompson |
| 7,463,467 | B2 * | 12/2008 | Lee et al. ............ 361/64 |
| 2002/0006199 | A1 | 1/2002 | Sako |
| 2002/0173927 | A1 | 11/2002 | Vandiver |
| 2005/0280965 | A1 | 12/2005 | Lee |
| 2006/0095507 | A1 | 5/2006 | Watson |
| 2006/0193099 | A1 | 8/2006 | Schweitzer |

FOREIGN PATENT DOCUMENTS

| | | | |
|---|---|---|---|
| EP | 0455 314 | B1 | 11/1994 |
| EP | 0525 428 | B1 | 11/1995 |
| EP | 0437 861 | B1 | 6/1996 |
| EP | 0488 123 | B1 | 6/1996 |
| EP | 0384 435 | B1 | 8/1996 |
| JP | 54105750 | | 8/1979 |
| JP | 54132747 | | 10/1979 |
| JP | 1268423 | | 10/1989 |
| JP | 1303011 | | 12/1989 |
| JP | 2013220 | | 1/1990 |
| JP | 2106126 | | 4/1990 |
| WO | WO 86/00488 | | 1/1986 |
| WO | WO 88/05543 | | 7/1988 |
| WO | WO 89/09411 | | 10/1989 |

OTHER PUBLICATIONS

7SD512 V3 Digitaler Stromvergleichsschutz fur Leitungen, Geratehandbuch der Siemens AG, 1995 Order No. C53000-G1100-C105-1.

European Patent Application No. EP 0 554 553 A2.

A Numerical Current Comparison Protection With Digital Measured Value Transmission Over Fibre Optic Cable, Koch et al., Southern African Conference on Power System Protection, Sep. 1991.

A New Approach to Digital Current Differential Protection for Low and Medium Voltage Feeder Circuits Using a Digital Voice-Frequency Grade Communications Channel, Redfern et al., IEEE Transactions on Power Delivery 9 Jul. 1994, No. 3, New York, U.S.

European Patent Application No. EP 0 175 120 B2.

U.S. Appl. No. 08/546,477 dated 1995.

Withdrawal application for U.S. Appl. No. 08/546,477 dated 1995.

Delivery note for current comparison protection devices 7SD512 dated Feb. 1996.

Statutory Declaration by Mr. Staasmeier.

Acceptance report on 7SD512 apparatus (take-over report dated Nov. 27, 1996).

Schweitzer, III, Four New Digital Relays for Overhead Transmission Line Protection, 12th Annual Western Protective Relay Conference, Oct. 22-24, 1985. USA.

PCT/US2007/020369, Patent Cooperation Treaty, From the International Bureau, PCT Notification Concerning Transmittal of International Preliminary Report on Patentability (Chapter 1 of the Patent Cooperation Treaty), Date of Mailing: Apr. 9, 2009, Applicant: Schweitzer Engineering Laboratories, Inc.

* cited by examiner

APPARATUS, SYSTEM, AND METHOD FOR SHARING OUTPUT CONTACTS ACROSS MULTIPLE RELAYS

CROSS-REFERENCE TO RELATED APPLICATIONS

This application is a continuation-in-part of U.S. patent application Ser. No. 11/211,816, filed Aug. 25, 2005 now U.S. Pat. No. 7,463,467, which is itself a continuation-in-part of U.S. patent application Ser. No. 09/900,098, filed Jul. 6, 2001, and now U.S. Pat. No. 6,947,269.

FIELD OF THE INVENTION

The present invention relates generally to apparatus, systems, and methods for sharing resources across power protection devices, and more particularly to apparatus, systems, and methods for sharing contacts and forwarding commands across power protection devices using direct device-to-device communications, and even more particularly to apparatus, systems, and methods for sharing contacts and forwarding commands across identical power protection devices configured as a primary and a backup device.

DESCRIPTION OF THE PRIOR ART

In U.S. Pat. No. 5,793,750, the contents of which are hereby incorporated by reference, a communication system between two microprocessor-based protective relays for an electric power system is disclosed. Each of the two relays in that system has both transmit and receive modules, for directly transmitting indication status bits indicative of the result of selected protective functions of one relay from that one relay to the other, and vice versa.

The output status indication bits are sometimes used to identify the existence and location of a fault on the power line portion served by the two relays. One or both of the relays might initiate a circuit breaker trip action on the basis of the exchange of such information. The output status indication bits may be the result of processing functions in one of the relays involving the voltages and/or currents on the power line monitored by that relay. The output status indication bits may be used for various control, status, indication and protection functions. Examples of protection functions include permissive overreaching transfer trip (POTT) actions, permissive under-reaching transfer trip (PUTT) actions, directional comparison unblocking (DCUB) and direct transfer trip (DTT) actions. Other relay-to-relay operations are possible using particular output status indication bits.

The advantage of the communication system described in the '750 application is that it is fast and secure. Protective relays typically accomplish their monitoring functions several times each power system cycle. The '750 communication system provides the results of these monitoring functions of one relay, to the other relay. The information is transmitted directly over a communications link from an originating relay which may or may not trip its associated circuit breaker based on its operational results, to another relay. The receiving relay then uses the transmitted information, in the form of digital bits, to perform its own on-going calculations, producing various protection actions such as tripping and closing a circuit breaker when appropriate. The communication between the two relays may be bidirectional, allowing the two relays to exchange information concerning the results of their own calculations both quickly and securely, with a minimum amount of expense.

Power protection devices, such as power protection relays, are often installed in a primary-backup configuration. The two devices maintain constant communication, with the primary device sending a health signal to the backup device. The backup device assumes the protection function if the health signal drops beneath a certain level or disappears entirely. This adds a level of reliability to the protected power system.

Power protection devices must interface with an operator's power protection site, and therefore, must gather information from other equipment at the site and provide certain information to other equipment at the site. Power protection devices may accomplish this in a variety of ways, such as through the use of a network. However, input and output contacts are the most common way to exchange information between power protection devices. For instance, power protection devices frequently must know the status of the contacts of a circuit breaker or recloser, before ordering the circuit breaker or recloser to open or close. This is provided as a contact input to an interested power protection device. Further, operators often maintain alarm grids, from which they can monitor the operation of their networks. When a power protection device detects a fault, and orders an associated breaker or recloser to trip, the power protection device closes an output contact attached to the operator's alarm grid.

Often, inputs and outputs can be divided into critical and non-critical functions. For instance, an alarm status output related to gas pressure in a monitored circuit breaker would not be judged as critical, while an overcurrent condition resulting in the relay tripping a circuit breaker would be judged as critical. When power protection devices are configured as primary and backup, operators may specify different outputs and inputs for each device, with critical functions handled by the primary device or redundantly.

When possible, power protection device suppliers and system operators prefer to use the same device for both the primary and backup protection device. However, operator specifications may make it difficult or impossible for a supplier to fill a contract with only one device, particularly in regards to input and output contact requirements for the separate devices, as well as space requirements. For instance, an operator specification may require that both the primary and secondary devices fit in a single rack, and that neither device is more than four rack units in height. Further, the operator may require the primary device to provide fourteen contact outputs and twenty contact inputs, and the backup device to provide no contact inputs and four contact outputs. Notwithstanding that a total of eighteen contact outputs and twenty contact inputs are required, if the provider wished to utilize the same equipment as both the primary and the backup using present technology, the provider would have to provide two devices with fourteen contact outputs and twenty contact inputs. This would leave ten contact outputs and twenty contact inputs unused on the backup device, which would be inefficient. Further, a device with fourteen contact outputs and twenty contact inputs may be larger than a four unit high rack device.

One reference in the prior art touches on this issue, although it does not directly address it. U.S. Pat. No. 7,027,896, filed Aug. 19, 2003, and issued to Michael Thomson of Schweitzer Engineering Laboratories of Pullman Wash., discloses a substation control system utilizing a number of input/output modules used to gather inputs from a power substation for a number of logic processors, which communicate with the input/output modules through a fiber-optic network. However, this reference does not disclose resource sharing or command forwarding between intelligent power protection devices.

OBJECTS OF THE INVENTION

Accordingly, it is an object of this invention to provide a mechanism to share output contacts across multiple power protection devices.

Another object of this invention is to provide a communications protocol between multiple power protection devices for sharing contacts.

Yet another object of this invention is to provide a communications protocol whereby one power protection device can forward commands to another power protection device.

SUMMARY OF THE INVENTION

The disclosed invention achieves its objectives through the use of a device-to-device direct communication system. The device-to-device direct communication system allows one device to utilize both the input and output contacts of the other device as needed. In addition, one device may forward or source commands to the other device.

In one embodiment of the invention, a power system device-to-device direct communication system comprises a first intelligent electronic device with a processor and a transmit module. Software within the processor maintains a list of "virtual outputs." Within the transmit module, part of which may be implemented within the processor, a number of data channels are maintained. The processor transfers the virtual outputs into the data channels, and transmits the data channels to a second intelligent electronic device. The second intelligent electronic device receives the data channels and extracts the virtual output bits. The second intelligent electronic device then adjusts a group of its own output contacts in accordance with the received virtual output bits.

In another embodiment of the invention, a power system device-to-device direct communication system comprises a first intelligent electronic device with a first processor and a receive module coupled to a communication link. The receive module receives channel data from the communication link including a virtual input. The processor examines the received data including the virtual input and alters its internal state based on the received data. A second intelligent electronic device monitors its input contact with a second processor. The second intelligent electronic device also has a transmit module coupled to the second processor, where a plurality of data channels are formed including a virtual input formed from the status of the input, which is transmitted to the first intelligent electronic device.

In a further embodiment of the invention, a power system device-to-device communication system comprises a first intelligent electronic device with a first processor, a command input, and a transmit module coupled to a communication link. The first processor forms a plurality of data channels including at least one command channel based on the command input, and transmits the plurality of data channels to a second intelligent electronic device. The second intelligent electronic device receives the plurality of data channels with a receive module and extracts the command channels using a second processor. The second processor then executes the command.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENTS

As indicated above, the present invention is based on and is an improvement of the communication system of U.S. Pat. No. 5,793,750, which includes a direct communication link between two protective relays serving an electric power apparatus, the system supporting a communication arrangement or protocol involving eight data channels for exchange of output status indication bits between the two relays both quickly and securely. The channel data bits TMB1-TMB8 identify eight transmit bits, on eight data channels.

Those bits, when received by the other relay, are identified as received channel data bits RMB1-RMB8, wherein RMB1-RMB8 are the "mirror" or replica of the transmit channel data bits. The eight data channels can accommodate at least eight output status indication bits. As indicated above, however, in many two-relay arrangements, only two or perhaps three channels are necessary to communicate the output status indication bits. Utilizing the present invention, the otherwise vacant channel space can now be used by selected additional data (discussed below) and an associated synchronization channel to synchronize the additional data.

The additional data can be digitized analog quantities, such as metering data, or can be "virtual terminal" data. In a virtual terminal implementation, a human user or another application utilizes the direct communication link to communicate with the other relay. For example, the human user could utilize the direct communications link to control or query the other relay. An application such as, for example, an integration protocol like as DNP3, could also utilize the communications link in the virtual terminal implementation.

Figure 1:
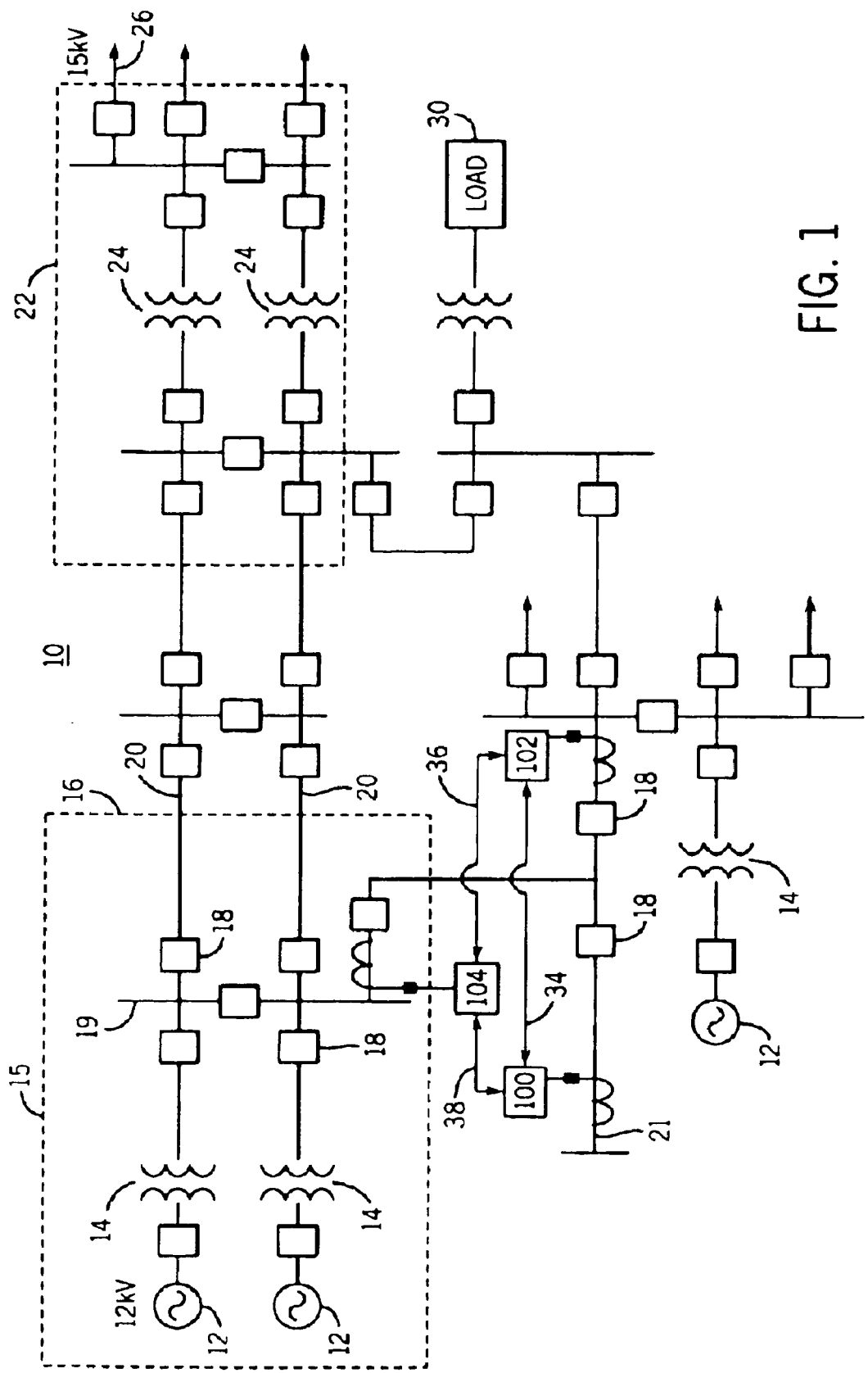
FIG. 1 is a simplified single line schematic diagram of a typical wide area power system.

FIG. 1 is a simplified single line schematic diagram of a typical wide area power system 10. As illustrated in FIG. 1, the power system 10 includes, among other things, two generators 12 each configured to generate three-phase sinusoidal waveforms, for example, three-phase 12 kV sinusoidal waveforms, two step-up power transformers 14 configured to increase the 12 kV sinusoidal waveforms to a higher voltage, such as 138 kV, and a number of circuit breakers 18. The step-up power transformers 14 provide the higher voltage sinusoidal waveforms to a number of long distance transmission lines such as the transmission lines 20. In one embodiment, a first substation 16 may be defined to include the generators 12, the step-up transformers 14 and the circuit breakers 18, all interconnected via a first bus 19. At the end of the long distance transmission lines 20, a second substation 22 may include step-down power transformers 24 to transform the higher voltage sinusoidal waveforms to lower voltage sinusoidal waveforms (e.g., 15 kV) suitable for distribution via a distribution line to various end users 26 and loads 30.

As previously mentioned, the power system 10 includes protective devices and procedures to protect the power system elements from faults or other abnormal conditions The protective devices and procedures utilize a variety of protective logic schemes to determine whether a fault or other problem exists in the power system. For example, some types of protective relays utilize a current differential comparison to determine whether a fault exists in the protection zone. Other types of protective relays compare the magnitudes of calculated phasors, representative of the power system sinusoidal waveforms, to determine whether a fault exists in the protection zone. Frequency sensing techniques and harmonic content detection is also incorporated in protective relays to detect fault conditions. Similarly, thermal model schemes are utilized by protective relays to determine whether a thermal problem exists in the protection zone.

Referring again to FIG. 1, also included are a first and a second protective relay 100 and 102 adapted to provide for example, overcurrent protection for the transmission line 21. As described below, the first and second protective relays 100, 102 are also adapted to communicate via a communication link 34 that can be configured using one of a number of suitable media. Additional protective relays such as a protective relay 104, adapted to communicate with the first protective relay 100 and/or the second protective relay 102, may also be included in the power system 10.

Figure 2:
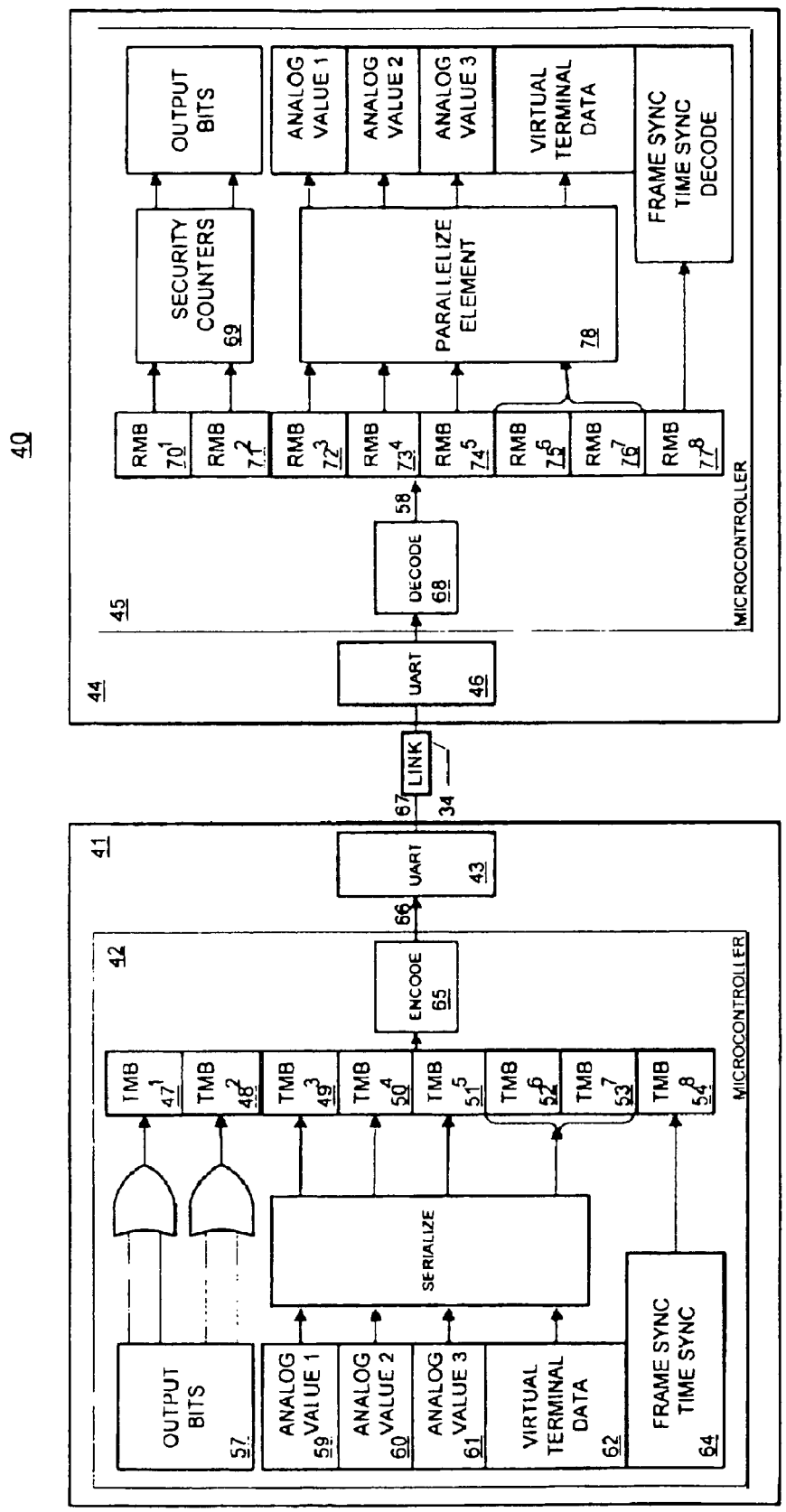
FIG. 2 is a simplified block diagram of a relay-to-relay direct communication system within the power system of FIG. 1 constructed in accordance with an embodiment of the invention.

FIG. 2 is a simplified block diagram of a relay-to-relay direct communication system 40 incorporated in the power system 10. Although illustrated using the first and second protective relays 100, 102, it should be understood that the communication system 40 can include additional protective relays operatively coupled to the first and/or second relay 100, 102 and adapted to operate as described below. Further, although illustrated using the first and second protective relays 100, 102, it should be understood that the apparatus and method described herein is applicable to communication between any intelligent electronic device (IED) of the power system 10.

For ease of discussion, the first protective relay 100 is shown as the transmitting relay and includes, inter alia, a "transmit" module 41, having a microcontroller 42 operatively coupled to a receive and transmit interface means; in this example, a universal asynchronous receiver/transmitter (UART) 43. The (transmitting) UART 43 is configured to convert bytes of channel data bits (corresponding to the channel data) resulting from operation of the first protective relay 100 into a single serial message stream for outbound transmission via the communication link 34 to the second protective relay 102, and to convert an inbound serial message stream (from the second protective relay 102) into bytes of channel data suitable for use by the first protective relay 100.

Similarly, the second protective relay 102 is shown as the receiving relay and includes, inter alia, a "receive" module 44 having a second microcontroller 45 operatively coupled to another UART 46, operational and configured as described above. Although not separately illustrated, each of the first and second protective relays 100, 102 include both transmit and receive capability to enable communication. While illustrated as transmit and receive modules 41, 44, in a simplified functional block diagram format, the relay-to-relay direct communication system and method described herein may be implemented by means of a microprocessor or field programmable gate array (FPGA) executing a computer program, protection algorithm or relay logic scheme. Further, although illustrated as a UART 43 operatively coupled to the first microcontroller 42, and a UART 46 operatively coupled to the second microcontroller 45, one of any suitable transmit and receive interface means may be utilized to convert bytes of channel data bits into a serial message stream for transmission via the communication link 34.

The transmit module 41 and the receive module 44 are operatively connected via the communication link 34. As noted above, the communication link 34 may be implemented as an RF link, a microwave link, an audio link, a fiber optic link, or another other type of suitable link adapted to carry serial data. As illustrated, in addition to output status indication bits, each of the transmit and receive modules 41, 44 is capable of transmitting/receiving other types of channel data in the form of serial messages. For example, the channel data may include digitized analog values, derived from analog quantities, that require more than a single bit such as metering information, breaker failure system security enhancement information, reclose enable information, instrument transformer checking and multi-terminal fault location information, to name a few.

Referring to the transmit module 41, an eight data channel arrangement is configured such that two data channels, a data channel 47 and a data channel 48, correspond to the conventional output status indication bits 57 transmitted as channel data bit TMB1 and TMB2, respectively, from the transmit module 41 of the first protective relay 100 to the receive module 44 of the second protective relay 102. Three data channels, a data channel 49, a data channel 50 and a data channel 51, are dedicated to digitized analog values 59, 60 and 61 transmitted as channel data bits TMB3, TMB4 and TMB5, respectively, from the transmit module 41 of the first protective relay 100 to the receive module 44 of the second protective relay 102.

Each of the digitized analog values 59, 60, 61 are formed by, for example, converting a 32-bit floating point number representing an analog quantity (e.g., system impedances, currents, voltages)) into an 18-bit floating point number. The 18-bit floating point number is then serialized such that one bit from each of the digitized analog values 59, 60, 61 is included as channel data bits TMB3, TMB4 and TMB5, respectively, in sequential transmitted messages until all of the bits associated with the digitized analog values 59, 60, 61 are transmitted. For example, if each of the digitized analog values 59, 60, 61 is expressed in 18 bits, eighteen sequential serial messages are transmitted where the first serial message includes the first bit of the digitized analog value 59 transmitted as channel data bit TMB3, the first bit of the digitized analog value 60 transmitted as channel data bit TMB4, and the first bit of the digitized analog value 61 transmitted as channel data bit TMB5. Similarly, the second serial message includes the second bit of the digitized analog value 59 transmitted as channel data bit TMB3, the second bit of the digitized analog value 60 transmitted as channel data bit TMB4, and the second bit of the digitized analog value 61 transmitted as channel data bit TMB5, and so on.

It should be noted that while compromising some precision, the conversion scheme that converts a 32-bit floating point number (representing the analog quantity) into a corresponding 18-bit floating point number, enables quicker transmission to the second protective relay 102. It should also be noted that other conversion schemes may be utilized depending on the analog quantity measured, the precision required, and the speed of transmission desired.

Two additional data channels, a data channel 52 and a data channel 53 facilitate virtual terminal data transmitted as channel data bits TMB6 and TMB7, respectively, from the transmit module 41 of the first protective relay 100 to the receive module 44 of the second protective relay 102. As noted above, virtual terminal data refers to data provided by a user located at a local relay (e.g., the first relay 100), to a remote relay (e.g., the second relay 102) via the communication link 34. In such a configuration, the local relay operates as a virtual terminal to allow the user to query and/or control the remote relay with the familiar serial port user interface passing data on otherwise unused channels. The virtual terminal scheme also adds fast meter/operate capability. Like the digitized analog values described above, the virtual terminal data is serialized bit-by-bit such that, for example, 18-bit virtual terminal data is transmitted bit-by-bit in 18 sequential serial messages where the first two bits are payload flags and the last sixteen bits are two 8-bit data bytes. For example, the 18-bit virtual terminal data may be expressed as: $p_1 p_2 d_{16} d_{15} d_{14} d_{13} d_{12} d_{11} d_{10} d_9 d_8 d_7 d_6 d_5 d_4 d_3 d_2 d_1$ where $p_1=1$ indicates that $d_1-d_8$ is a payload byte, and $p_2=1$ indicates that $d_9-d_{16}$ is a payload byte (see, FIG. 3).

The eighth data channel 54 is dedicated to synchronization information transmitted as channel data bit TMB8 from the transmit module 41 of the first protective relay 100 to the receive module 44 of the second protective relay 102. The synchronization information enables synchronization of the data channels associated with the analog values 59, 60, 61 and the virtual terminal data 62. Thus, when any of the data channels 47-53 are used for anything other than the output status indication bits, a dedicated synchronous channel is allocated for synchronization information transmitted as channel data bit TMB8.

Although illustrated utilizing an eight data channel arrangement, it should be understood that a different number or arrangement and/or assignment of data channels can be used by the first and second protective relays 100, 102 of the communication system 40. Accordingly, the two data channels of output status indication bits in combination with the three data channels of analog values and the two data channels of virtual terminal data illustrated in FIG. 2 is arbitrary. The output status indication bits could occupy more or less or no data channels, the analog values could occupy more or less or no data channels, and the virtual terminal data could occupy more or less or no data channels. In addition, one analog value can occupy more than one data channel for speedier transmission. Similarly, virtual terminal data can occupy more than one data channel for speedier transmission.

Further, in one embodiment of the invention, the arrangement and/or assignment of the data channels may be fixed, while in another embodiment, the arrangement and/or assignment of the data channels may be dynamically changed during relay operation, depending on the desired configuration of the protective relay(s) 100, 102. As a result, speed of receipt of the channel data by the receive module 44 is adjustable based on the assignment of the channel data to the number of data channels.

For example, if 18-bit virtual terminal data is dynamically assigned to one data channel during a high activity period of relay operation, it is transmitted bit-by-bit in 18 sequential serial messages, and then reassembled for use by the receiving relay. If one message is transmitted every 1 millisecond via the communication link 34, 18 milliseconds are required for receipt of the entire 18-bit virtual terminal data. In contrast, if the same 18-bit virtual terminal data is dynamically assigned to three data channels during a lower activity period of relay operation, it is transmitted bit-by-bit in 6 sequential serial messages, requiring six milliseconds.

Prior to transmission, each of the eight channel data bits TMB1-TMB8 is encoded by an encoder 65 to form an encoded message 66 using one of any number of suitable techniques. The encoded message 66 may therefore have one of any number of suitable formats, depending on the encoding scheme selected. For example, in one encoding scheme, the encoded message 66 may include 36 or 40 bits, divided into four 9-bit (for 36 bit length) or 10-bit (for 40 bit length) characters plus a number of idle bits. The number of idle bits may vary depending upon the selected transmission speed.

Continuing with the example, the bits may be assembled such that the first 9-10 bit character includes a single start bit followed by the six channel data bits TMB1-TMB6, followed by an odd parity bit and one or two stop bits, as selected by the user. The second character may include a second single start bit, followed by the six channel data bits TMB5, TMB6, TMB7, TMB8, TMB1 and TMB2, followed by an odd parity bit and one or two stop bits. The third character may include a start bit followed by the six channel data bits TMB7, TMB8, TMB1, TMB2, TMB3 and TMB4, followed by an odd parity bit and one or two stop bits. The fourth and final character in the message may include a single start bit followed by the six channel data bits TMB3-TMB8, followed by an odd parity bit and one or two stop bits. The remaining bits, if any, are a variable number of idle bits, depending upon transmission speed of the data.

Using such an encoding scheme, each of the channel data bits TMB1-TMB8 are repeated three times in the four character portions of one encoded message 66 with single stop and parity bits and one or two stop bits inserted between each character portion of the encoded message 66. This encoding scheme allows the receiving, or second protective relay 102, to check for errors that may have occurred during transmission.

In addition to assembling the bits into messages, each of the first and second protective relays 100, 102 may be adapted to further encode and decode using an identifier pattern selected during system configuration. For example, if preprogrammed to include one particular identifier pattern, the transmit encoder 65 logically inverts one of the four characters in each of the messages as a means of encoding the identifier pattern into the message. As described below, the receiving, or second, relay 102 then ensures that the received message has been encoded with the correct identifier pattern. Although described as assembling messages where one character is logically inverted, it should be understood that other suitable formats and encoding schemes may be utilized by the encoder 65 to generate the encoded message 66.

The encoded message 66 is then applied to the UART 43, adapted to satisfy several operating parameters for the system. In general, the UART 43 converts the encoded message 66 into a serial message 67 for transmission as part of a serial message stream via the communication link 34. Accordingly, the receiving UART 46 must also be capable of checking the received serial message 67 for proper framing (the presence of one stop bit per byte) and proper parity, and detecting overrun errors.

The UART 43 can be programmed for various baud rates. For example, it can be programmed for baud rates ranging from 300 through 115,000. The UART 43 is additionally adapted to synchronize both transmit and receive serial messages using transmit and receive clocks externally supplied. As will be appreciated by one skilled in the art, the method of bit synchronization, using start and stop bits or using synchronizing clocks, is one of any number of suitable methods for synchronization.

Subsequent to being prepared for transmission by the UART 43, the serial message 67 is transmitted over the communication link 34 to the receive-module 44. The sampling and transmission rates can be varied depending on the desired operation of the transmitting relay.

Referring now to the receive module 44, the receiving UART 46 provides the counterpart functions of the transmitting UART 43. When the serial message 67 is received by the receive module 44, the UART 46 performs several data checks on each character of the serial message 67. It also checks each character of the serial messages 67 for proper framing, parity and overrun errors.

From UART 46, the characters of the serial message 67 are passed to a decoder 68. In general, the decoder 68 reassembles groups of four characters in order to reconstruct the four character message. Next, the decoder 68 checks each message for errors, and also examines the results of the UART checks described above. If any of the checks fail, the decoder 68 discards the message and de-asserts a DOK (data OK) flag 94 for that message in a register 95 (see, FIG. 3).

More specifically, in the illustrated example, the decoder 68 ensures that there are the three copies of the eight channel data bits TMB1-TMB8 included in the transmitted four-character encoded message 66. If an identifier pattern was used to encoder the encoded message 66, the decoder 68 also checks to ensure that the encoded message 66 includes the identifier pattern. It should be noted that the encoding/decoding scheme described above is one of any number of suitable encoding/decoding schemes to enable error detection that may be utilized in the method and apparatus of the invention.

As a result of operation of the decoder 68, the DOK flag 94 and the channel data bits RMB1-RMB8 are provided. The received channel data bits RMB1-RMB8 are the mirror or replica of transmitted channel data bits TMB1-TMB8. The data OK (DOK) flag 94 provides an indication of whether errors were detected in the received message.

Like the transmit module 41 of the first relay 102, the receive module 44 of the second relay 102 includes an eight data channel arrangement where two data channels are dedicated to the output status indication bits, three data channels are dedicated to three digitized analog values, two data channels are dedicated to virtual terminal data and one data channel is dedicated to synchronization information. Accordingly, the output status indication bits 57 are received as channel data bits RMB1 and RMB2 via data channels 70 and 71, respectively, and are applied to one or more security counters 69. The security counters 69 operate to ensure that the state of the received channel data bits RMB1 and RMB2 remain constant for a pre-selected number of received serial messages 67 before the output status indication bits are utilized by downstream processes. Ensuring that the state of the output status indication bits remain constant increases the reliability and security associated with the output status indication bits 57.

Because the two channel data bits RMB1 and RMB2 are transmitted bit by bit, no synchronization of those bits is required. The channel data bits RMB1 and RMB2 are used by the second relay 102 to make determinations concerning operation of the power system 10 (as detected by the first protective relay 100) including possible circuit breaker trip action when appropriate. In the illustrated example, the digitized analog values 59, 60 and 61 are received as channel data bits RMB3, RMB4, and RMB5 via a data channel 72, a channel 73 and a channel 74, respectively. Each of the three digitized analog values 59, 60, 61 are received serially one bit per message per data channel, and are then parallelized in a parallelize element 78. The parallelize element 78 re-assembles each of the three digitized analog values from received successive decoded messages 58. As noted above, in the illustrated example, each of the digitized analog values 59, 60, 61 includes eighteen bits. In an embodiment, sixteen bits are used for information while the remaining two bits are unused. Therefore, for every 18 messages, a complete original analog value is received on each corresponding data channel.

Similarly, the virtual terminal data 62 is received as channel data bits RMB6 and RMB7 via data channels 75 and 76, respectively. Like the analog values 59, 60, 61, the virtual terminal data 62 is received serially one bit per message per data channel, and is also parallelized in the parallelize element 78. In the illustrated embodiment, the virtual terminal data 62 includes eighteen bits. Sixteen bits of the eighteen bits are utilized for virtual terminal data, where the sixteen bits are divided into two eight-bit bytes. The two remaining bits are used to indicate which of the two eight-bit byte fields actually contain virtual terminal data, and which, if any, are idle, (e.g., waiting for user input). Thus, for every 18 decoded messages 58, two virtual terminal bytes are received on each corresponding data channel 75, 76. After parallelization via the parallelize element 78, the analog values and the virtual terminal data are provided to the second protective relay 102.

Again, the particular arrangement of the eight data channel bits TMB1-TMB8 is established in accordance with the user's communication requirements. Different numbers of output status indication bits, analog values and virtual terminal data can be utilized to form seven bits of the eight channel data bits TMB1-TMB8.

A data channel 77, or synchronization channel, is dedicated to the remaining channel data bit, RMB8. The channel data bits RMB8 of the synchronization channel enable the receiving decoder 68 and parallelize element 78 to find the start and stop boundaries serial messages that include the digitized analog values and virtual terminal data. The synchronization channel is necessary when any of the other channel data bits include the digitized analog values or the virtual terminal data. If all of the channel data bits are used for output status indication bits only, no synchronization is necessary and the data channel 77 may be used for output status indication bits.

In order to determine that a complete (four character) bit message has been received, the second relay 102 identifies the first byte of each of the bit messages via message synchronization. In one embodiment, message synchronization is maintained by counting modulo 4 from the first received byte after byte synchronization is achieved. Accordingly, each time the counter rolls over, the first byte is received.

Figure 3:
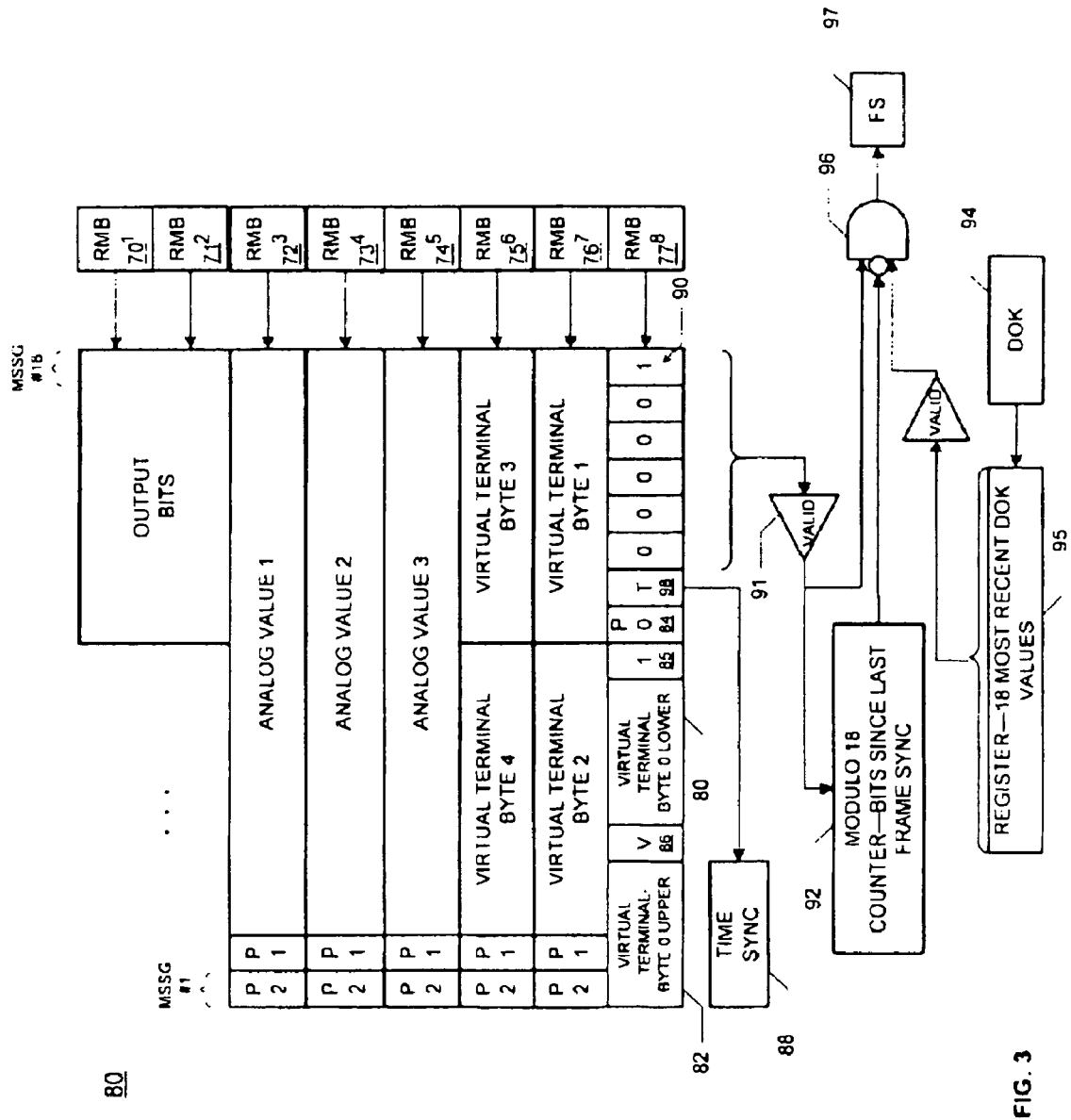
FIG. 3 is an exemplary-received frame of the relay-to-relay direct communication system of FIG. 2.

FIG. 3 illustrates an exemplary received frame 80 of the relay-to-relay direct communication system 40, according to an embodiment of the invention. As illustrated, the received frame 80 includes 18 messages where a series of the "bottom" channel data bit (TMB8) provides the 18-bit synchronization information after encoding, transmission and decoding. In addition, the analog values and virtual terminal data are received as channel data bits RMB3-RMB7 via data channels 72-76.

Referring to the data channel 77, or the synchronization channel, a special frame synchronization pattern, for example 000001, is utilized to indicate that all other data channels (e.g., data channels 70-76) are at the beginning of a frame. In the illustrated example, when the last six bits received on the synchronization channel are 000001 (the 1 being most recent), then the other data channels are determined to be at a frame boundary. For example, the synchronization channel may be expressed as $d_8 d_7 d_6 d_5 v d_4 d_3 d_2 d_1 1 pt000001$ where, $d_x$=virtual terminal data, 1=binary one, 0=binary zero, p=1 indicates that the virtual terminal data is valid, .nu. is a virtual terminal flag byte; it is normally 1, but is set to 0 to indicate a special flag byte is in the virtual terminal data, and t=time sync bit.

A comparator 91 in FIG. 3 is adapted to enable detection of the special frame synchronization pattern in the six most recently received channel data bits (from the six most recently received messages). Upon detecting the special frame synchronization pattern via operation of the comparator 91, a modulo 18 counter 92 is interrogated. If the modulo 18 counter 92 is not zero, it is reset to zero and the data on the synchronization, virtual terminal data and analog value channels (i.e., channels 72-77) since the last valid frame sync (FS) signal 97 is discarded. Therefore, if the modulo 18 counter 92 is at zero, if all of the 18 most recent data OK (DOK) flags in register 95 are valid (e.g., a binary 1 value) and if the comparator 91 is asserted indicating detection of the special frame synchronization pattern, then an AND-gate 96 asserts the FS signal 97, resulting in the analog values and virtual terminal data being utilized by the receiving, or second relay 102.

The synchronization channel, dedicated to the channel data bit RMB8, includes an additional virtual terminal character separated into two four-bit segments 80 and 82. Further, a bit 84 has a binary 1 value if the additional virtual terminal character contains valid data, and has binary 0 value if the additional virtual terminal character is idle (such as might be the case if the virtual terminal session is waiting for input from the user). A bit 85 of the synchronization channel 77 has a binary 1 value, and a bit 86 typically has a binary 1 value, except under special conditions described below. When both of the bits 84 and 85 have a binary 1 value, five consecutive zeros in the synchronization channel are not possible. This ensures that the frame synchronization pattern 000001 detected by comparator 91 can only occur at frame boundaries.

The additional terminal character contained in half-bytes 80 and 82 can also include control characters, intended to indicate from one relay (transmitting) to the other (receiving) when virtual terminal communication should be established, terminated, paused, etc. When one of these control characters is included in the additional virtual terminal character, bit 86 is forced to a binary 0 value. The special control characters are chosen carefully by the system designer such that, even with bit 86 at the binary 0 value, the frame synchronization pattern 000001 can only occur at a frame boundary.

In addition, a bit T 98 in the synchronization channel comprises a separate serial data stream, transmitted at the rate of one bit per 18 messages (frame). This separate serial data stream contains date and time information. Each time the FS signal 97 asserts, a time synchronization device 88 accepts the bit T 98. An additional frame synchronization system, similar to the frame synchronization system described above, allows the time synchronization device 88 to recognize the boundaries between successive time synchronization messages. Namely, a specific frame synchronization pattern is placed in the serial data stream formed by the bit t 98 (i.e., a bit t serial data stream). A comparator detects the specific frame synchronization pattern, and signals that the time-of-day and calendar day information, contained in the bit T serial data stream may be used. The data included in the bit T serial data stream is formatted such that the frame synchronization pattern can only occur at frame boundaries. The time synchronization device 88 then updates the time-of-day clock and the calendar day with the time-of-day and calendar day information contained in the bit T serial data stream.

Unlike control inputs of typical protective relays, the relay-to-relay direct communication system disclosed herein includes communication link monitoring capability via detection of corrupted serial messages when they occur. That is, when a corrupted serial message is received by the receive module 44, it may be concluded by the receive module that the corrupted serial message is the result of faulty operation or degradation of the communication link 34 and/or associated transmission equipment. Suitable alarming may be utilized to notify the user of the condition where the communication link 34 and/or associated equipment remains faulty for a predetermined duration.

The relay-to-relay direct communication system disclosed herein also includes communication link monitoring via detection of missing serial messages. Because, the serial messages 67 are transmitted via the communication link 34 at pre-determined periodic intervals, or at a predictable rate, it can be concluded by the receive module that the missing serial message(s) 67 is/(are) the result of faulty operation or degradation of the communication link 34 and/or associated transmission equipment. For example, if the transmit module 41 is transmitting 250 serial messages every second (a rate of one message every 4 milliseconds), and the receive module 44 does not receive a serial message in an 8 millisecond period, a problem with the communication link and/or associated equipment may be concluded. In both-instances, the DOK flag 94 indicates the problem with the communication link 34 and/or associated equipment, and the received analog values and/or virtual terminal data is not utilized by the receiving relay (see, FIG. 3).

The relay-to-relay direct communication system disclosed herein further includes an ability to determine communication link availability, or channel availability, defined as that portion of time the communication link 34 and/or associated equipment is capable of properly delivering uncorrupted serial messages 67. Communication link availability may be calculated by dividing the aggregate number of all of the received uncorrupted serial messages by the total expected serial messages in a recording period. For example, for a recording period of 24 hours, at 250 serial messages per second the transmitting module 41 transmits 21,600,000 messages and the receive module 44 receives 21,590,000 serial messages 67 because 9000 of the serial messages were corrupted and 1000 of the serial messages were missing. The channel availability would therefore be 21,590,000/21,600,000=99.9537%. Suitable alarming may be utilized to notify the user when the channel availability falls below a predetermined threshold.

As will be appreciated by one skilled in the art, variations of availability calculations are possible such as, for example, counting received frames 80 to determine availability of the digitized analog values and/or virtual terminal data. For example, because 18 received frames are needed to reconstruct an 18-bit digitized analog value, receipt of only 17 of the 18 frames would indicate an analog value availability of 94.44%.

Accordingly, the relay-to-relay direct-communication system disclosed herein is adapted to (1) directly communicate output status indication bits which represent the result of protection functions by one of the relays, (2) directly communicate selected analog values representing one or more functions of the relay, (3) directly communicate virtual terminal data provided by a user to one of the relays via the other relay, (4) monitor the communication link between the two relays, (5) determine communication link availability and (6) provide time synchronization. The analog values and the virtual terminal data are processed in serial fashion in successive messages on channels not used by the output status indication bits. The time synchronization data is processed in serial fashion in successive frames (18 messages) of data.

As noted above, the number of and assignment of data channels for the output status indication bits and the additional data (analog values and virtual terminal data) can be pre-selected by an operator or can be dynamically selected during relay operation. The additional data may include analog values only, virtual terminal data only or a combination of analog values and virtual terminal data. The synchronization channel is dedicated for purposes of synchronizing the additional data, to transmit/receive additional virtual terminal data, time information and calendar (date) information. This results in the channel capability of the basic transmission arrangement disclosed in the '750 patent being used to its maximum extent, while providing the benefits of the existing fast and highly secure transmission of output status indication bits.

Figure 4:
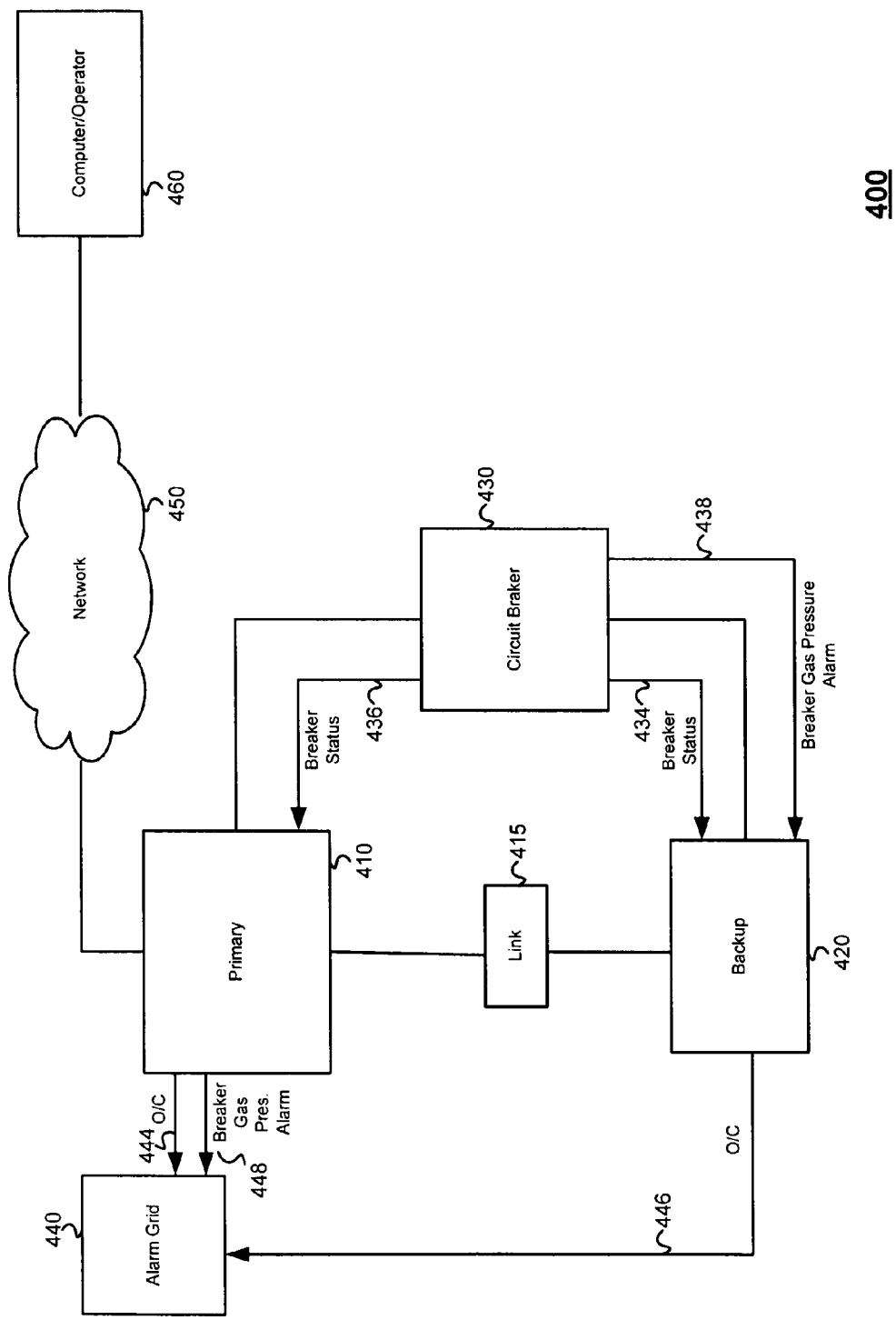
FIG. 4 is a simplified functional block diagram of a system constructed in accordance with the an embodiment of the invention wherein a primary power protection device controls the functioning of a backup power protection device.

FIG. 4 illustrates a power protection system 400 utilizing a primary 410 and a backup 420 protection device to oversee the operation of a circuit breaker 430. As illustrated, both the primary device 410 and the backup device 420 are identical. The circuit breaker provides a breaker status signal 434,436 to both the primary 410 and backup 420 devices. The breaker status signal 434,436 indicates whether the breaker is open or closed, and is used by both the primary device 410 and the backup device 420 to determine whether or not to open the circuit breaker on detection of a fault.

The primary device 410 and the backup device 420 also provide overcurrent indications 444,446 to an alarm grid 440. Further, the breaker provides a breaker gas pressure alarm signal 438 to the backup device 420. As explained later, the backup device transmits this alarm condition over a link 415 to the primary device 410. The primary device 410 processes the transmission and outputs a breaker gas pressure alarm 448 to the alarm grid 440.

The primary device 410 is also connected to a communications network 450. An operator may use a computer 460 connected to the same network 450 to send commands to the primary device 410. The operator may also direct commands to the backup device 420 through the primary device 410, which is coupled to the backup device by link 415.

Figure 5:
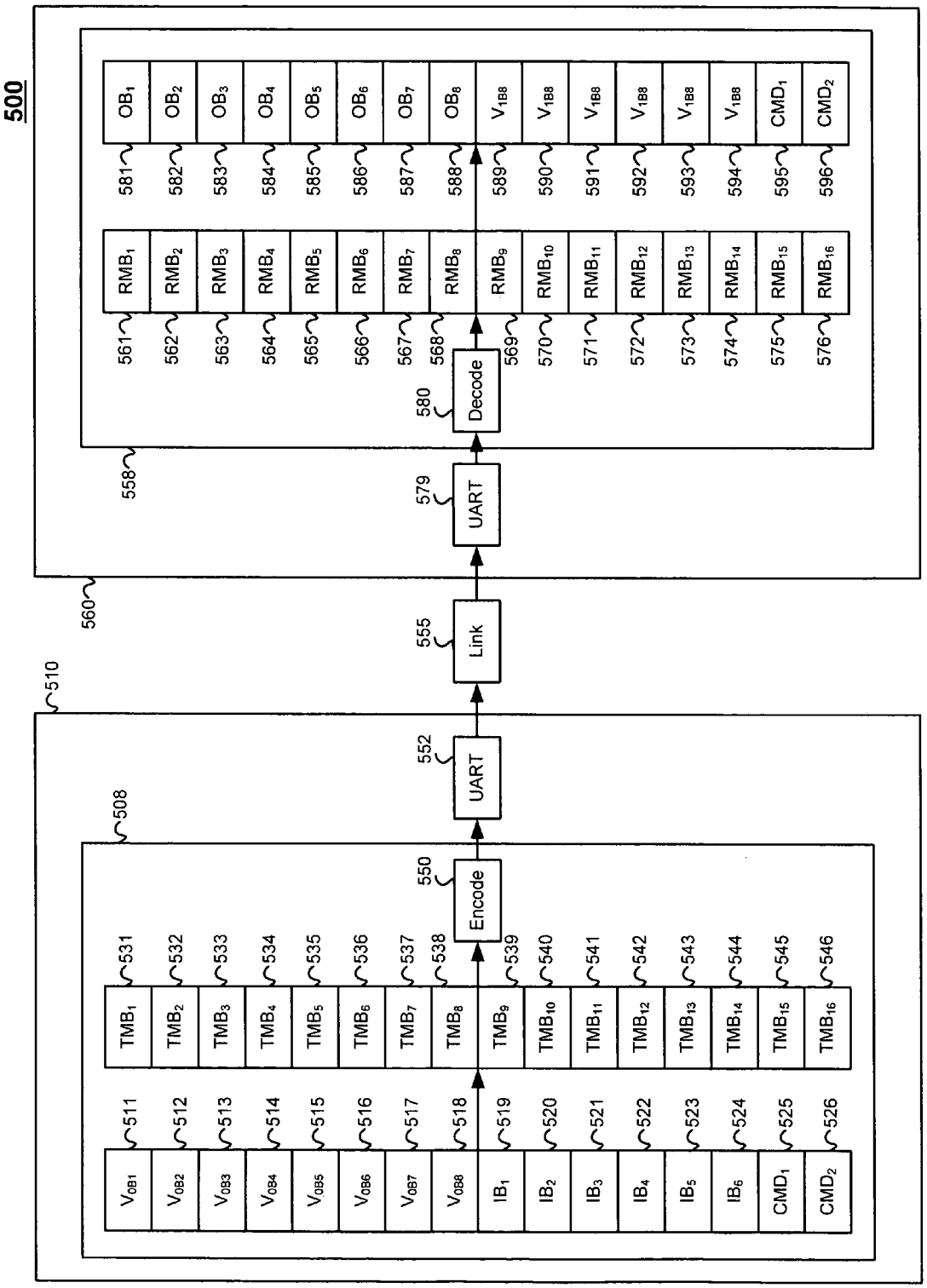
FIG. 5 is a simplified block diagram of a relay-to-relay direct communication system for use in the power system of FIG. 1, constructed in accordance with an embodiment of the invention.

FIG. 5 is a block diagram of a device-to-device direct communication system 500 within the power system 400, constructed according to an embodiment of the invention. FIG. 5 is largely analogous to FIG. 2, discussed earlier. However, FIG. 5 utilizes sixteen data channels, and their specific use is described below. The first eight data channels 531-538 are used as "virtual output bits" for the primary device. The virtual output bits 511-518 denoted $VOB_1$-$VOB_8$ are transferred into the first eight data channels 531-538. The primary protective device 504 transmits the status of the virtual output channels to the backup protective device 556 which operates output contacts in accordance with the virtual output channels, as explained later.

The next six data channels 519-524, denoted $IB_1$-$IB_6$ (input bit) are virtual input channels. The primary protective device 504 collects the status of its input contacts 508 and places the collected status into the input bits 519-524. Those bits are then transmitted to the backup protective device 556, which maintains corresponding virtual input bits, and may use the virtual input bits in its internal calculations.

The final two data channels 525-526, denoted CMD1-CMD2 are command channels. Using these channels, the primary protective device 504 may issue commands to the backup device 556. The commands may be relayed through the primary protective device 504 from an operator as illustrated in FIG. 4. The commands may also be sourced from the operation of the primary device 504. For example, an external operator could alter the cold load pickup setting both the primary protective device 504 and backup protective device 556 using the CMD data channels 525-526.

When a frame is ready to transmit, the processor encodes at 550 the data using any one of a number of suitable techniques. The data is then passed to a UART 552, where it is transmitted by a link 555 to the backup protection device 556. The backup protection device 556 then retrieves the data from a UART 579 and decodes at 580 the data into sixteen parallel received bits 561-576. The received bits 561-576 are separated into $OB_{1-8}$ (output bits 1-8) 581-588, $VIB_{1-6}$ (virtual input bits 1-6) 589-594, and $CMD_{1-2}$ (command bits 1-2) 595-596. The backup protection device adjusts its output contacts (not shown) to conform to the received output bits. It also updates its internal operations with the virtual input bits, and executes any commands required by the command bits.

Figure 6:
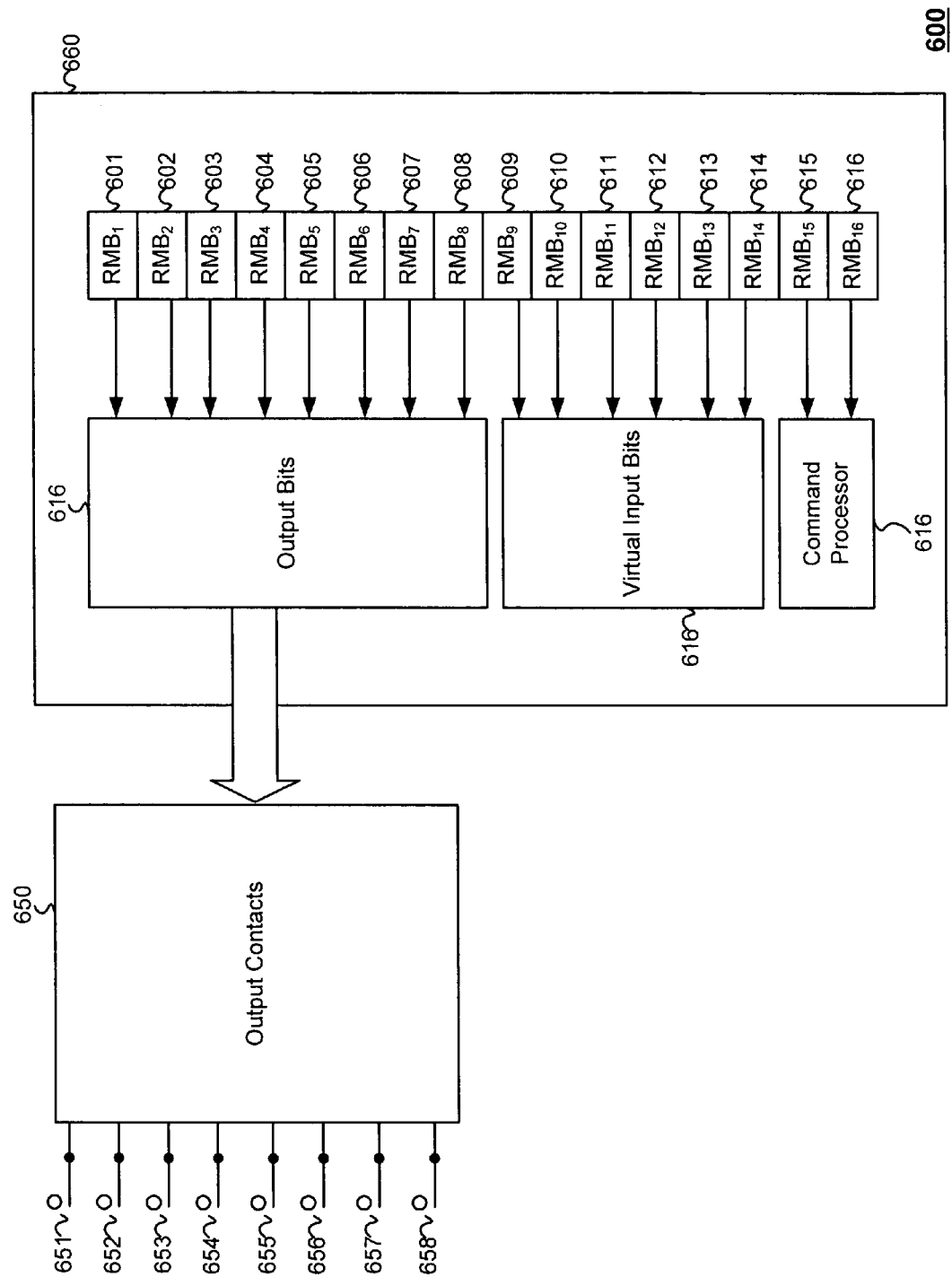
FIG. 6 is an exemplary-received frame of the relay-to-relay direct communication system of FIG. 4.

FIG. 6 is an exemplary received frame 600 of the device-to-device direct communication system 500, according to an embodiment of the invention. As illustrated, the received frame includes sixteen bits. Of these, eight are output bits 620. The processor 660 reconfigures the output contacts 651-658 to match the state of the output bits 620. The received frame also includes six virtual input bits 616, which correspond to inputs of the primary protection device 504. The processor 660 adjusts its internal memory and operating state based on the virtual input bits 630. Finally, the received frame includes two command channels 640. These channels may encompass messages that are many bits long, and will need to be assembled frame by frame before they can be executed. Once the command messages are assembled, they are executed by the command processor 640, which adjusts the internal state of processor 660 and output contacts 650.

The virtual input bits 616 can be used to convey the status of an input contact from one device to the other device. For instance, one device may monitor signals, such as a circuit breaker-in service signal, a circuit breaker test mode signal, or a circuit breaker manual close indication signal. The monitored signals may then be transformed into digital bits and transferred to the other device, where they are used internally in the second devices calculations. Other signals which may be monitored using virtual input bits are cold load pickup on/off, or the status of a second circuit breaker.

Each virtual output bit may be based on a single setting within the primary protection device, or a combination of settings within the primary protection device. The table below illustrates some common power protection settings:

| Setting | Description |
| --- | --- |
| 50PH | Phase Instantaneous Definite-Time Overcurrent Elements |
| 50N | Residual Ground Instantaneous Definite-Time Overcurrent Elements |
| E50Q | Negative-Sequence Instantaneous Definite-Time Overcurrent Elements |
| E51S | Selectable Operating Quantity Inverse Time Overcurrent Element |
| EV/D1 | Manual Close Command for Circuit Breaker D1 |
| EV/D2 | Manual Close Command for Circuit Breaker D2 |
| 43OP | Reclosing Control Activation Parameter |
| 43PR | 51PR Detector Activation Parameter |

Virtual output bits may also be used so that one device; i.e.; the primary device; may control output contacts on another device; i.e.; the backup device. Some virtual output bit functions can be ground overcurrent on/off indication, remote on/off indication, and auto-reclosing of the second circuit breaker.

So, for instance, using the disclosed invention, a virtual output bit could be set in the primary based on a negative-sequence instantaneous definite-time overcurrent element (E50Q), or it could be based on a negative sequence instantaneous definite-time overcurrent element and a phase instantaneous definite-time overcurrent element (50PH).

Note that the invention described herein utilizes a digital processor. As the algorithms described do not require any particular processing characteristics, any type of processor will suffice. For instance, microprocessors, microcontrollers, digital signal processors, field programmable gate arrays, application specific integrated circuits (ASIC) and other devices capable of digital computations are acceptable where the term processor is used.

In addition, the term intelligent electronic device is used. An intelligent electronic device is defined, for terms of this application, as a power protection device (i.e.; non-power protection devices such as general computers are not intended) including a processor for decision making. Examples of intelligent electronic devices are relays of various types and recloser controls.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A device-to-device direct communication system in a power system comprising:
   i) a first intelligent electronic device having a first processor and a transmit module coupled to a communication link and the processor, the processor providing a plurality of data channels and forming channel data including at least one virtual output; and
   ii) a second intelligent electronic device coupled to said first intelligent electronic device with the communication link, the second processor, and a receive module coupled to the communication link, the second processor accepting the plurality of data channels and said channel data including the at least one virtual output to control said output of the second intelligent electronic device.

2. The device-to-device direct communication system of claim 1, wherein the second intelligent electronic device is identical to the first intelligent electronic device.

3. The device-to-device direct communication system of claim 1, wherein the first intelligent electronic device and the second intelligent electronic device are configured in a primary-backup scheme.

4. A device-to-device direct communication system in a power system comprising:
   i) a first intelligent electronic device having a first processor and a receive module coupled to a communication link and the processor, the processor accepting a plurality of data channels from the communication link including at least one virtual input, the processor changing its internal state based on the at least one virtual input; and
   ii) a second intelligent electronic device coupled to said intelligent electronic device with the communication link, said second intelligent electronic device having at least one input, a second processor coupled to the at least one input, and a transmit module coupled to the communication link and the second processor, said second processor providing said plurality of data channels and forming channel data including said virtual input corresponding to said input, and transmitting said channel data to said first intelligent electronic device with the transmit module.

5. The device-to-device direct communication system of claim 4, wherein the second intelligent electronic device is identical to the first intelligent electronic device.

6. The device-to-device direct communication system of claim 4, wherein said first intelligent electronic device and said second intelligent electronic device are configured in a primary-backup scheme.

7. The device-to-device direct communication system of claim 4, wherein said first intelligent electronic device further comprises a trip output, and the trip output is based on the at least one virtual input.

8. A device-to-device direct communication system in a power system comprising:
   i) a first intelligent electronic device having a command input, a first processor, and a transmit module coupled to a communication link, said first processor providing a plurality of data channels and forming channel data including at least one virtual command formed from the command input; and
   ii) a second intelligent electronic device coupled to said first intelligent electronic device by said communication link, said second intelligent electronic device having a receive module and a second processor, said second processor accepting said plurality of data channels and said channel data including said virtual command and executing said virtual command.

9. The device-to-device direct communication system of claim 8, wherein said second power protection device further comprises at least one output, and wherein said second processor executes said command and in response thereto alters said output.

10. A method for a first intelligent electronic device to control at least one output contact of a second intelligent electronic device comprising the steps of:
    i) forming a plurality of data channels including at least one virtual output bit on the first intelligent electronic device;
    ii) transmitting the plurality of data channels to the second intelligent electronic device; and
    iii) adjusting the at least one output contact of the second intelligent electronic device based on the at least one virtual output bit.

11. A method for a first intelligent electronic device to monitor at least one input contact of a second intelligent electronic device comprising the steps of:
    i) forming at least one virtual input bit corresponding to the at least one input contact of the second intelligent electronic device;
    ii) forming a plurality of data channels including the at least one input contact on the second intelligent electronic device;
    iii) transmitting the plurality of data channels to the first intelligent electronic device; and iv) adjusting the internal state of the first intelligent electronic device based on the at least one virtual input bit.

12. A method for a first intelligent electronic device to forward commands to a second intelligent electronic device comprising the steps of:
   i) receiving a command at the first intelligent electronic device;
   ii) forming at least one command channel based on the command;
   iii) forming a plurality of data channels including the at least one command channel;
   iv) transmitting the plurality of data channels to the second intelligent electronic device; and
   v) executing the command on the second intelligent electronic device.

* * * * *

UNITED STATES PATENT AND TRADEMARK OFFICE
CERTIFICATE OF CORRECTION

PATENT NO. : 7,701,683 B2  Page 1 of 2
APPLICATION NO. : 11/540253
DATED : April 20, 2010
INVENTOR(S) : Robert E. Morris et al.

It is certified that error appears in the above-identified patent and that said Letters Patent is hereby corrected as shown below:

Column 7 line 21, the text
.sub.12d.sub.11d.sub.10d.sub.9d.sub.8d.sub.7d.sub.6d.sub.5d.sub.4d.sub.3d.sub.1
printed overlapping text in Column 8, line 21.

Column 7, lines 20-24, the text should appear as follows:
p.sub.1p.sub.2d.sub.16d.sub.15d.sub.14d.sub.13d.-
sub.12d.sub.11d.sub.10d.sub.9d.sub.8d.sub.7d.sub.6d.sub.5d.sub.4d.sub.3d.-
sub.1 where p.sub.1-1 indicates that d.sub.1-d.sub.8 is a payload byte, and
p.sub.2=1 indicates that d.sub.9-d.sub.16 is a payload byte (see FIG. 3).

Column 8, lines 14-29, the text should appear as follows:
Continuing with the example, the bits may be assembled such that the
first 9-10 bit character includes a single start bit followed by the six channel
data bits TMB1-TMB6, followed by an odd parity bit and one or two stop bits, as
selected by the user. The second character may include a second single start
bit, followed by the six channel data bits TMB5, TMB6, TMB7, TMB8, TMB1
and TMB2, followed by an odd parity bit and one or two stop bits. The third
character may include a start bit followed by the six channel data bits TMB7,
TMB8, TMB1, TMB2, TMB3 and TMB4, followed by an odd parity bit and one or
two stop bits. The fourth and final character in the message may include a
single start bit followed by the six channel data bits TMB3-TMB8, followed by
an odd parity bit and one or two stop bits. The remaining bits, if any, are a
variable number of idle bits, depending upon transmission speed of the data.

Column 11, line 4, the text
d.sub.8d.sub.7d.sub.6d.sub.5vd.sub.4d.sub.3d.sub.2d.sub.11pt000001
printed overlapping text in Column 12, line 4.

Column 11, lines 4-9 the text should appear as follows:
d.sub.8d.sub.7d.sub.6d.sub.5vd.sub.4d.sub.3d.sub.2d.sub.11pt000001 where,
d.sub.x=virtual terminal data, 1=binary one, 0=binary zero, p=1 indicates that Signed and Sealed this Sixth Day of July, 2010

David J. Kappos
*Director of the United States Patent and Trademark Office* the virtual terminal data is valid, .nu. is a virtual terminal flag byte; it is normally 1, but is set to 0 to indicate a special flag byte is in the virtual terminal data, and t=time sync bit.

Column 12, lines 4-15, the text should appear as follows:
Unlike control inputs of typical protective relays, the relay-to-relay direct communication system disclosed herein includes communication link monitoring capability via detection of corrupted serial messages when they occur. That is, when a corrupted serial message is received by the receive module 44, it may be concluded by the receive module that the corrupted serial message is the result of faulty operation or degradation of the communication link 34 and/or associated transmission equipment. Suitable alarming may be utilized to notify the user of the condition where the communication link 34 and/or associated equipment remains faulty for a predetermined duration.